United States Patent [19]

Fujimura

[11] Patent Number: 5,684,655
[45] Date of Patent: Nov. 4, 1997

[54] LOADING UNIT, FOR DATA WRITING AND/OR READING DEVICE, HAVING IMPROVED RELIABILITY IN LOADING/EJECTING OPERATION AND HAVING FUNCTION ENABLING EASY EJECTION

[75] Inventor: Nobuhiko Fujimura, Hachioji, Japan

[73] Assignee: TEAC Corporation, Tokyo, Japan

[21] Appl. No.: 470,753

[22] Filed: Jun. 6, 1995

Related U.S. Application Data

[63] Continuation of Ser. No. 144,056, Oct. 27, 1993, abandoned.

[30] Foreign Application Priority Data

Aug. 20, 1993 [JP] Japan ................... 5-45528 U

[51] Int. Cl.$^6$ ................................. G11B 17/04
[52] U.S. Cl. ................ 360/97.01; 360/99.02; 360/99.06; 369/77.2
[58] Field of Search ............... 360/97.01, 99.02, 360/99.03, 99.06, 99.07, 96.5, 96.6, 133; 369/77.1, 77.2

[56] References Cited

U.S. PATENT DOCUMENTS

| | | | |
|---|---|---|---|
| 4,870,518 | 9/1989 | Thompson et al. | 360/97.01 |
| 4,941,140 | 7/1990 | Ono et al. | 369/264 |
| 4,965,685 | 10/1990 | Thompson et al. | 360/97.01 |
| 5,025,339 | 6/1991 | Kanno et al. | 360/99.06 |
| 5,084,792 | 1/1992 | Watanabe | 360/96.5 |
| 5,113,297 | 5/1992 | Yoshida | 360/99.06 |
| 5,140,478 | 8/1992 | Yoshida | 360/97.01 |
| 5,148,339 | 9/1992 | Yoshida | 360/105 |
| 5,204,794 | 4/1993 | Yoshida | 360/133 |
| 5,237,473 | 8/1993 | Yoshida | 360/99.06 |

*Primary Examiner*—Robert S. Tupper
*Assistant Examiner*—William R. Korzuch
*Attorney, Agent, or Firm*—Michael N. Meller

[57] ABSTRACT

An ejecting mechanism ejects the data writing and/or reading device, which has been loaded on the loading unit, from the loading unit. A preventing mechanism prevents the data writing and/or reading device from either being loaded on or being ejected from the loading device while power is active in the loading unit. A connecting/disconnecting mechanism connects the data writing and/or reading device to an external apparatus when the data writing and/or reading device is loaded on the loading unit. The mechanism also disconnects the data writing and/or reading device from the external apparatus when the data writing and/or reading device is ejected from the loading unit. A signal may be transferred between the external apparatus and the data writing and/or reading device and the external apparatus supplies power to the data writing and/or reading device while the data writing and/or reading device is loaded on the loading unit. A signal may be neither transferred between the external apparatus and the data writing and/or reading device nor may the external apparatus supply power to the data writing and/or reading device while the data writing and/or reading device is ejected from the loading unit.

1 Claim, 9 Drawing Sheets

LOADING UNIT, FOR DATA WRITING AND/OR READING DEVICE, HAVING IMPROVED RELIABILITY IN LOADING/ EJECTING OPERATION AND HAVING FUNCTION ENABLING EASY EJECTION

This application is a continuation of application Ser. No. 08/144,056, filed Oct. 27, 1993, now abandoned.

BACKGROUND OF THE INVENTION

The present invention relates to a loading unit for a data writing and/or reading device. One example of the data writing and/or reading device comprises a so-called hard disc device. (The term hard disc device is in general also called simply hard disc. Such a hard disc or hard disc device is a type of data storing device externally coupled to a host apparatus and contains a magnetic disc as a recording medium.)

Some apparatuses employing computers acting as a central processing unit thereof, such as a personal computer, are provided with systems for loading data writing and/or reading devices such as hard disc devices.

One example of such loading units for data writing and/or reading devices, has the following construction. That is, the data writing and/or reading device can be loaded in and can be ejected from the loading unit even at the following status of the loading unit. That is, the above operations can be performed even while power is active or power is switched on in the loading unit, where the loading unit may as a result supply power to the data writing and/or reading device.

However, troubles may occur if the data writing and/or reading device (hard disc device in this example) is ejected from the loading unit while power is active in the system. The troubles include damaging the hard disc device destroying and/or data stored in the hard disc device. There may be similar problems in a case where the hard disc device is loaded in the loading unit when the loading unit is in a state where power may be supplied to the hard disc device when it is loaded.

Further, the following troubles may also occur in the operations being performed in the above-mentioned situations. These include trouble occurring in integrated circuits (IC) employed in a host apparatus such as a personal computer and/or employed in the hard disc device, the IC acting as interfaces between the personal computer and the hard disc device. Such troubles occurring in the IC may occur due to a problem existing in a sequence in connecting and/or disconnecting of power supply lines and signal transferring lines among the connections between the personal computer and the hard disc device. The above-mentioned connections between the personal computer and the hard disc device can be established by loading the hard disc device in the loading unit by the function of the loading unit employed by the personal computer.

In particular, if there is a time when the power lines have been already disconnected but the signal transferring lines have not yet been disconnected, excess electric current may flow through the signal lines. Such excess current may damage the above-mentioned IC and/or may cause error in operations being carried out in the data bus of the personal computer.

The personal computer, in general, executes a so-called initializing operation in response to power being switched on therein. In such an initializing operation, the personal computer determines what peripheral devices such as a hard disc device are coupled thereto. If the first hard disc device is replaced by a second hard disc device without switching power off in the personal computer, problems may occur. This is because the first hard disc device has been first loaded in the loading unit and then the personal computer has determined the first hard disc device as a peripheral device coupled thereto. Then even after the first hard disc device has been replaced by the second hard disc device, the personal computer still operates as if the peripheral device coupled thereto is the first hard disc device. Such a status of control may result in erroneous operations.

According to functions of such a loading unit with which a personal computer is equipped, a connector mounted on the personal computer is electrically connected with a connector mounted on a hard disc device when the hard disc device is loaded in the loading unit by insertion. The connector of the personal computer projects into the loading unit in the state of the loading unit being mounted on the personal computer. By such a construction, the hard disc device is electrically connected with the personal computer as long as the hard disc device is loaded in the loading unit.

In this construction, it is necessary to overcome the friction force appearing between the connector of the hard disc device and the connector of the personal computer while the connectors are connected with one another. The operator should apply force to the hard disc device such as necessary to overcome the friction force so as to load the hard disc device in the loading unit. Variation, due to the insertion stroke, of the force (load) to be applied to the hard disc device required for loading the hard disc device in the loading device will now be described with reference to a solid curve A of FIG. 9. In the curve A of FIG. 9, the horizontal axis indicates the insertion stroke, that is, a length by which the hard disc device has been inserted into the loading unit. The vertical axis indicates the pressing force to be applied to the hard disc device, at the corresponding insertion stroke thereof, so as to load the disc device in the loading unit.

Figure 9:
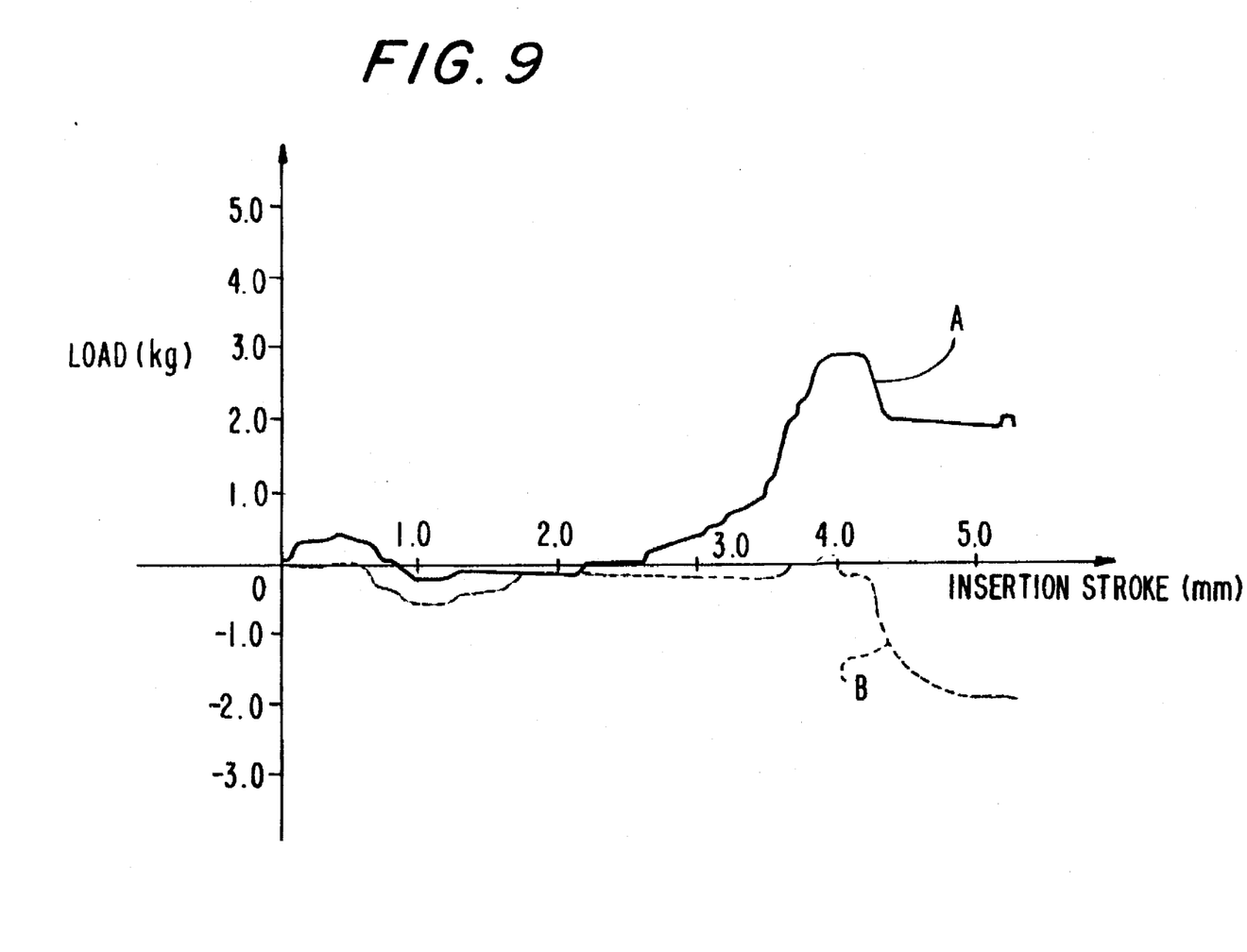
FIG. 9 shows a graph indicating a variation of a force (load) to be applied to the hard disc device in the ejecting action time in the related art.

As shown in the curve A of FIG. 9, almost no force is required for inserting the disc device until the insertion stroke reaches a certain length. Then, a relatively large force is required just before the loading of the disc device is completed. Such a relatively large force comprises a force used for overcoming the above-mentioned friction force appearing between both the connectors.

Subsequently, variation, due to the above-mentioned insertion stroke, of force required to eject the hard disc device once loaded in the loading unit therefrom will now be described with a dashed line B in FIG. 9. As shown in the dashed line B of FIG. 9, a relatively large force is required to eject the disc device just after the ejecting action has been started. Then, after completing the step of applying the relatively large force, almost no force is required to eject the disc device. Such a relatively large force comprises a force used for overcoming friction force appearing between both the connectors also when both connectors are being disengaged from one another.

Such force required to eject the disc device from the loading unit should be applied in a direction along which the disc device is ejected. This force to be applied is produced as a result of an ejection button, with which the loading unit is provided, being pushed by the operator. Thus, the operator should apply a relatively large force to the ejection button at the beginning of the ejecting action.

The ejection button is mounted on an edge of an ejection lever provided in the loading unit; an ejection arm is also provided in the loading unit. The ejection arm is supported in the loading unit so that the ejection arm can rotate about a rotational axis. The loading lever is engaged with the ejection lever and the loading lever is also to be engaged with the hard disc device so as to press it for ejection. This ejecting action is caused by the ejection lever rotating the ejection arm.

The following method may be considered so as to reduce the relatively large force, mentioned above, required to be applied to the ejection button. That is, the rotational axis of the ejection arm is located far from the ejection lever. That is, the so-called lever effect is applied so as to create a larger force from a smaller force by means of a difference between an arm length for the force to be applied and the other arm length for the force to be obtained as a result. In this method, such difference between the arm lengths required for activating the lever effect requires a larger distance through which the ejection lever must be moved or a larger distance by which the ejection button projects from the loading unit before the ejection button is pressed to activate the ejecting action. Thus, the entire size of the loading unit become undesirably large.

The force required to eject the disc device from the loading unit is determined mainly by the constructions of the above-mentioned connectors with which the hard disc device and the personal computer are provided, and which are connected with one another so that the disc device is electrically connected with the personal computer. As a result, this required force cannot be easily reduced. Further, the entire size of the loading unit should preferably be small. In order to achieve the small sized loading unit, it is necessary to provide the location of the above-mentioned rotational axis of the ejection arm so as to be near to the position where the force is to be applied to the arm so as to rotate it, that is, the rotational axis of the ejection arm should be near the ejection lever. Such arrangement is needed for preventing the ejection lever moving distance from being overly long and for preventing ejection button projecting length from being overly long. Thus, it has been impossible to realize a construction of the loading unit, by which construction a larger force may be created, for ejecting the hard disc device, from a smaller force applied to the ejection button.

SUMMARY OF THE INVENTION

An object of the present invention is to provide a loading unit for a data writing and/or reading device having the following advantages. The advantages include preventing: damages such as mentioned above, that is, affecting the data writing and/or reading device for example. Further, bad influences such as mentioned above can be prevented, that is, those occurring in a personal computer employing the loading unit and/or in programs running in the personal computer. This is because ejecting of the data writing and/or reading device is prevented while power is active in the loading unit.

Another object of the present invention is to provide a loading unit for a data writing and/or reading device having the following advantages. That is, pressing force to be applied to the ejection button of the loading unit can be made uniform while the data writing and/or reading device is ejected from the loading unit. This is because the ejecting action can be carried out in a manner such that a position where the ejection arm is in contact with the data writing and/or reading device moves so as to become farther away from the rotational axis of the ejection arm in the mechanism of the loading unit.

The above mentioned object may be also achieved by the following method. That is, the ejecting action can be carried out in a manner in which a position where the ejection arm is in contact with the ejection lever moves so as to become nearer the rotational axis of the ejection arm in the mechanism of the loading unit.

To achieve the above objects of the present invention, a loading unit is proposed according to the present invention, for a data writing and/or reading device containing a recording medium, comprises:

ejecting means for ejecting said data writing and/or reading device, which has been loaded in said loading unit, from said loading unit; and preventing means for preventing said data writing and/or reading device from either being loaded in or being ejected from said loading device while power is active in said loading unit.

By the above-mentioned construction, the preventing means prevents the data writing and/or reading device from being ejected while power is active in the loading unit. Due to power being active, power is also supplied to the data writing and/or reading device. The preventing means also prevents the data writing and/or reading device from being loaded to the loading unit while power is active in the loading unit. As a result, damage such as mentioned above, that is, damage to the data writing and/or reading device for example, can be prevented. Further, undesired forces such as mentioned above, occurring in a personal computer employing the loading unit and/or occurring in programs running in the personal computer, can be prevented.

Another loading unit, according to the present invention, for a data writing and/or reading device containing a recording medium comprises:

ejecting means for ejecting said data writing and/or reading device, which device has been loaded in said loading unit, from said loading unit;

a pressing member for carrying out pressing action in which said pressing member presses said data writing and/or reading device so as to carry out ejecting action in which said data writing and/or reading device is ejected from said loading unit; and means for causing a force to be made uniform, throughout an ejecting action, the force to be made uniform being a driving force necessary for said pressing member to carry out said ejecting action.

Another loading unit, according to the present invention, for a data writing and/or reading device containing a recording medium comprises:

ejecting means for ejecting, in response to an operation performed by an operator, said data writing and/or reading device, which has been loaded in said loading unit, from said loading unit;

pressing member for carrying out a pressing action in which said pressing member presses said data writing and/or reading device so as to carry out ejecting action in which said data writing and/or reading device is ejected from said loading unit; and altering means for altering, through the entirety of said ejecting action, a driving force necessary for said pressing member to carry out said ejecting action with respect to said pressing force being applied to said data writing and/or reading device.

By the above construction, a force being applied to the data writing and/or reading device may be larger at a particular time during the ejecting action than at other times during the ejecting action. A relatively large force is required at the particular time during the ejecting action depending on the construction of the loading unit and/or depending on a construction of an external apparatus with which the data writing and/or reading device is connected through the loading unit.

Other objects and further features of the present invention will become more apparent from the following detailed description when read in conjunction with the accompanying drawings.

THE DESCRIPTION OF THE PREFERRED EMBODIMENTS

Figure 1:
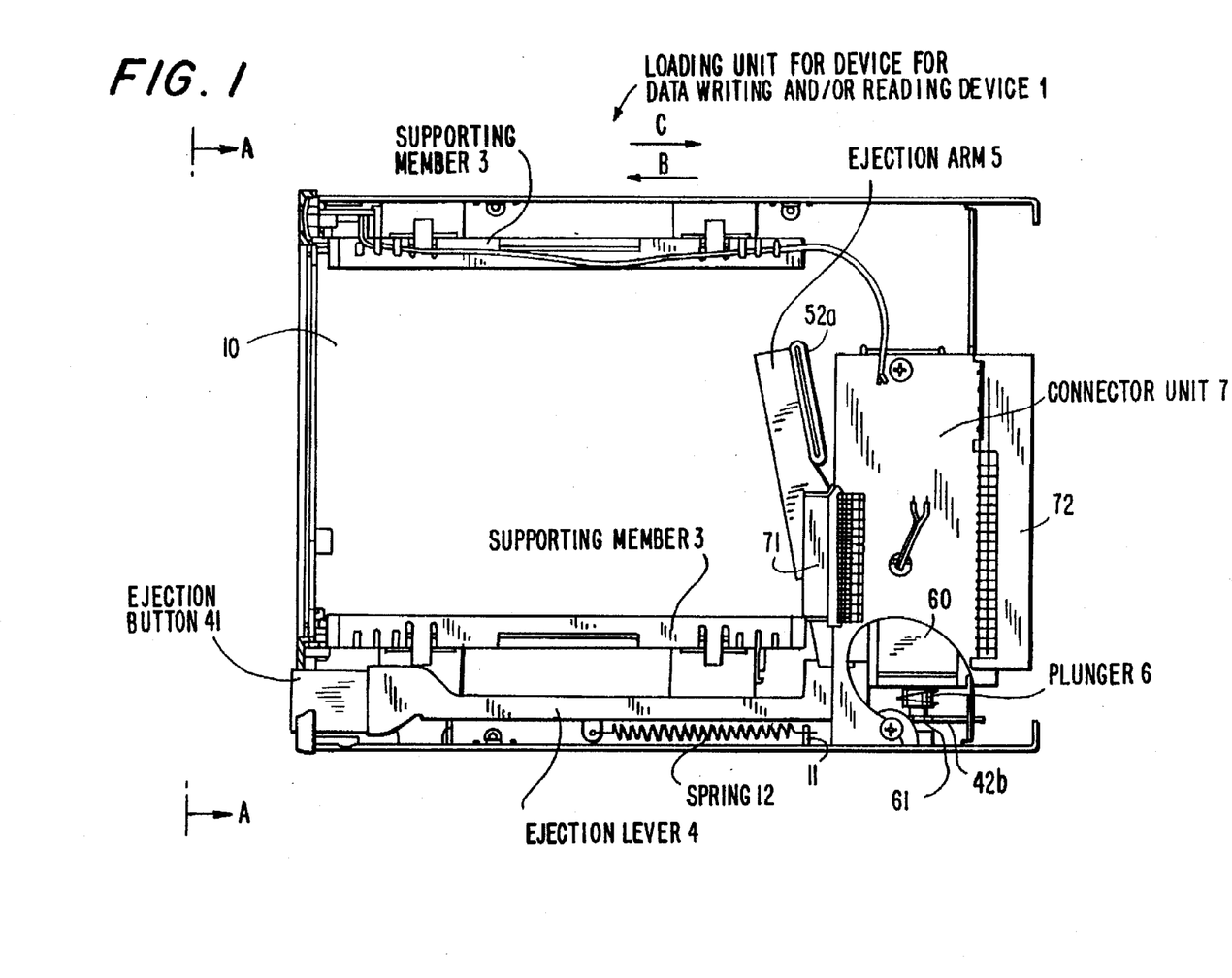
FIG. 1 shows a plan view of an internal construction of a loading unit, for a data writing and/or reading device, according to one embodiment of the present invention.
Figure 2:
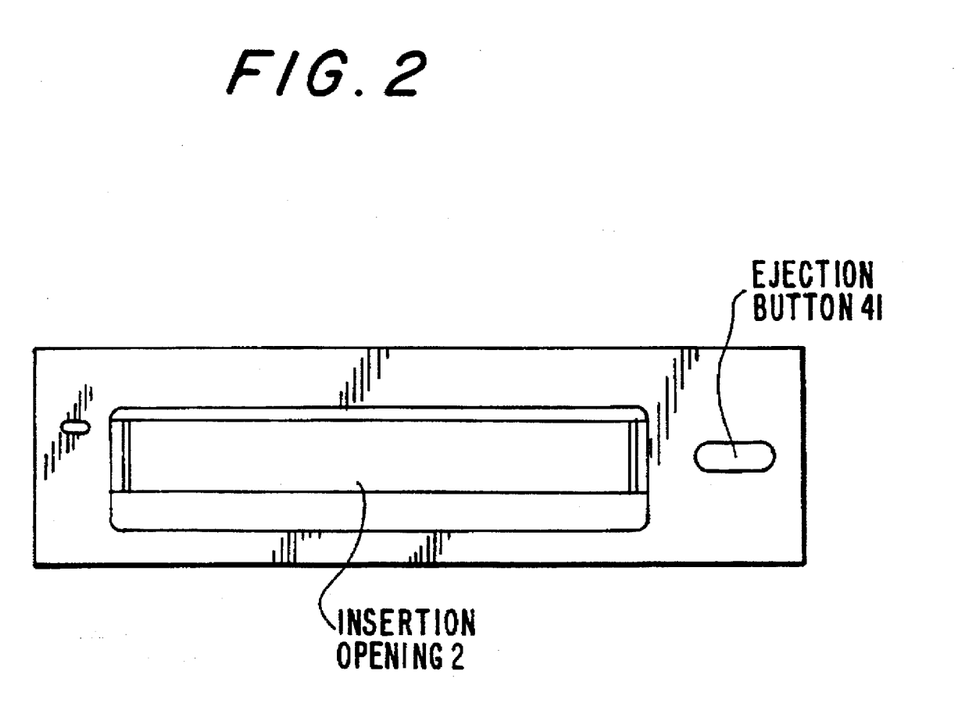
FIG. 2 shows a front elevation view of the loading unit of FIG. 1.
Figure 3:
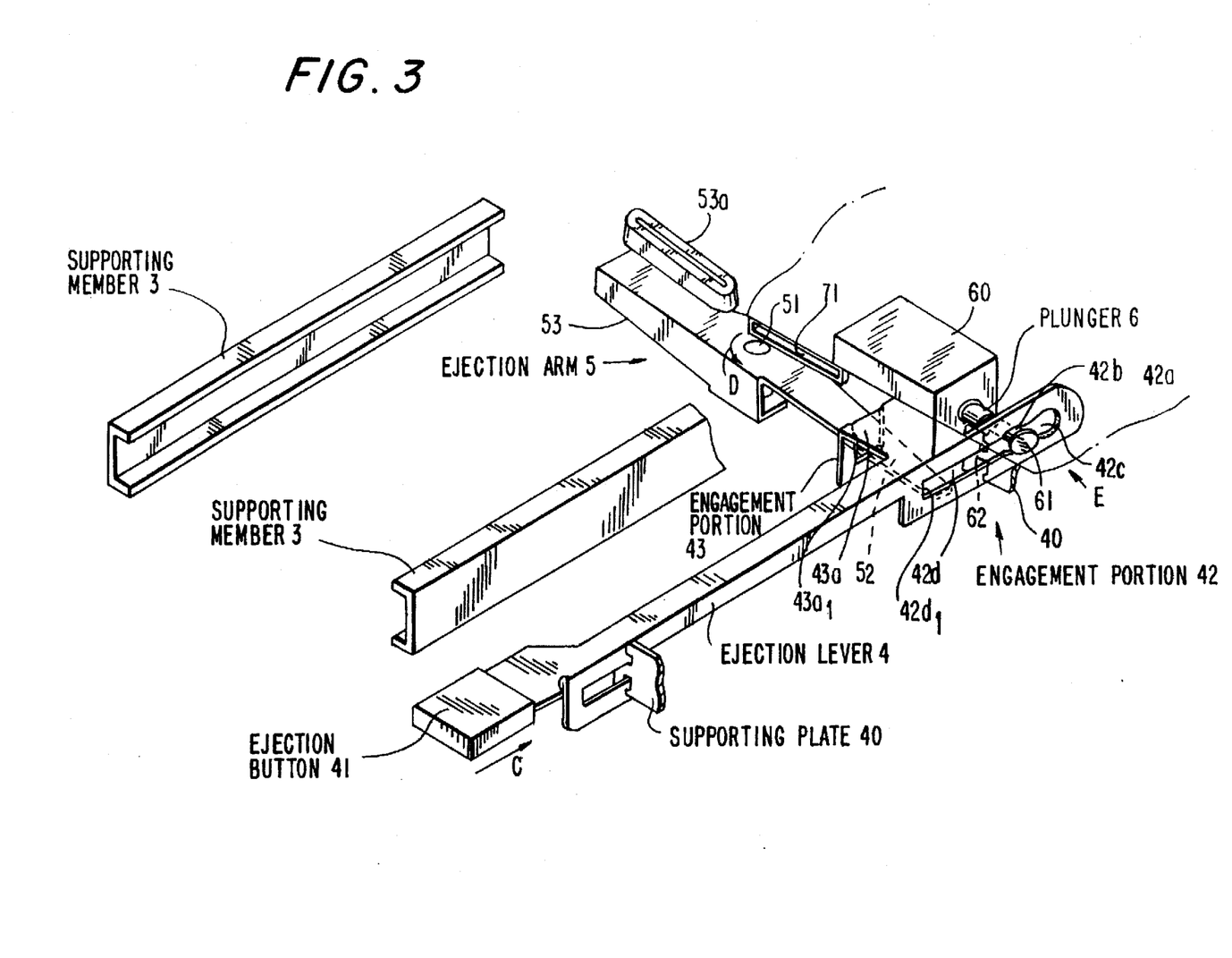
FIG. 3 shows an exploded perspective view of essential elements of the loading unit of FIG. 1.

An embodiment of the present invention will now be described with reference to FIGS. 1-3. As shown in FIGS. 1-3, a loading unit for a data writing and/or reading device (referred to simply as a loading unit) 1 is provided with an insertion opening 2, supporting members 3, ejection lever 4, ejection arm 5 and plunger 6.

The insertion opening 2 is, as shown in FIG. 2, located at approximately the center of the front surface of the loading unit 1. The insertion opening 2 is used for inserting into/ejecting from the loading unit 1 a data writing and/or reading device, such as a hard disc device.

The supporting members 3 are, as shown in FIGS. 1 and 3, arranged on either side, when viewed from the front, of a substrate 10 provided in the loading unit 1. Each of the supporting members 3 extends along the directions B and C of FIG. 1, from the front to the rear of the loading unit 1. The respective cross sections of the supporting members 3 are substantially C-shaped. A hard disc device inserted into the loading unit 1 is supported by the supporting members 3.

As shown in FIG. 3, two supporting plates 40 support the ejection lever 4 so that the ejection lever 4 can slide from the front to the rear of the loading unit 1 and vice versa. The two supporting plates 40 are fixed on the substrate 10. As shown in FIG. 1, one end of a spring 12 is fastened with a fixing member 11 onto the substrate 10 and the other end of the spring 12 is fastened to the ejection lever 4. As a result, the ejection lever 4 is always biased along the direction C (rightward in FIG. 1) by the restoration pulling force of the spring 12.

An ejection button 41 is mounted on the front end of the ejection lever 4 and engagement portions 42 and 43 are formed on the rear end of the ejection lever 4.

Stopper openings 42a and 42b, both having the same diameter, and engagement slits 42c and 42d, both having the same width are formed in the engagement portion 42. The slit 42c is located between the openings 42a and 42b, while the slit 42d is located at a position starting from the front edge of the opening 42b and extending toward the front end of the ejection lever 4. Each of the above-mentioned widths of the slits 42c and 42d is smaller than each of the above-mentioned diameters of the openings 42a and 42b. A cut-out portion 43a is formed in the engagement portion 43 so that the cut-out portion 43a faces the slit 42d.

As shown in FIG. 3, the ejection arm 5 is pivotably supported, about an axis 51, on the substrate 10 by means of the axis 51 fixed on the substrate 10. The right end arm 52, when viewed from the front of the loading unit 1, of the ejection arm 5 is inserted into the cut-out portion 43a formed in the engagement portion 43 and further inserted into the slit 42d of the engagement portion 42. The left end 53 of the ejection arm 5 is provided with a contacting portion 53a extending along the longitudinal direction of the ejection arm 5. The contacting portion 53a is used to come in contact with a hard disc device which is inserted into/ejected from the loading unit 1. The surface of the contacting portion 53a, which surface comes in contact with the hard disc device, is shaped like a projecting arc when viewed from the top. However, the degree of curvature of this arc-like projection is so slight that this surface is indicated as a straight line when viewed from the top in the drawings.

The right end arm 52 of the ejection arm 5 engages with the front end 42d1 of the slit 42d while the hard disc device is loaded in the loading unit 1. Further, in order to eject the hard disc device from the loading unit 1, the operator should push the ejection button 41 along the direction C of FIG. 3. As a result, the ejection button 41 and the ejection lever 4 slide along the direction C. By this movement of the ejection lever 4, the ejection arm 5 pivots about the axis 51 in the direction D as a result of the front end 42d1 of the slit 42d pushing the right end arm 52 of the ejection arm 5.

At this time of operation, an engaging position on the right end arm 52 of the ejection arm 5 at which the right end arm 52 of the ejection arm 5 engages with the front end 42d1 of the slit 42d moves in a manner described below. The nearer this engaging portion on the right end arm 52 of the ejection arm 5 moves to the axis 51, the further the ejection lever 4 slides along the direction C.

Figure 5:
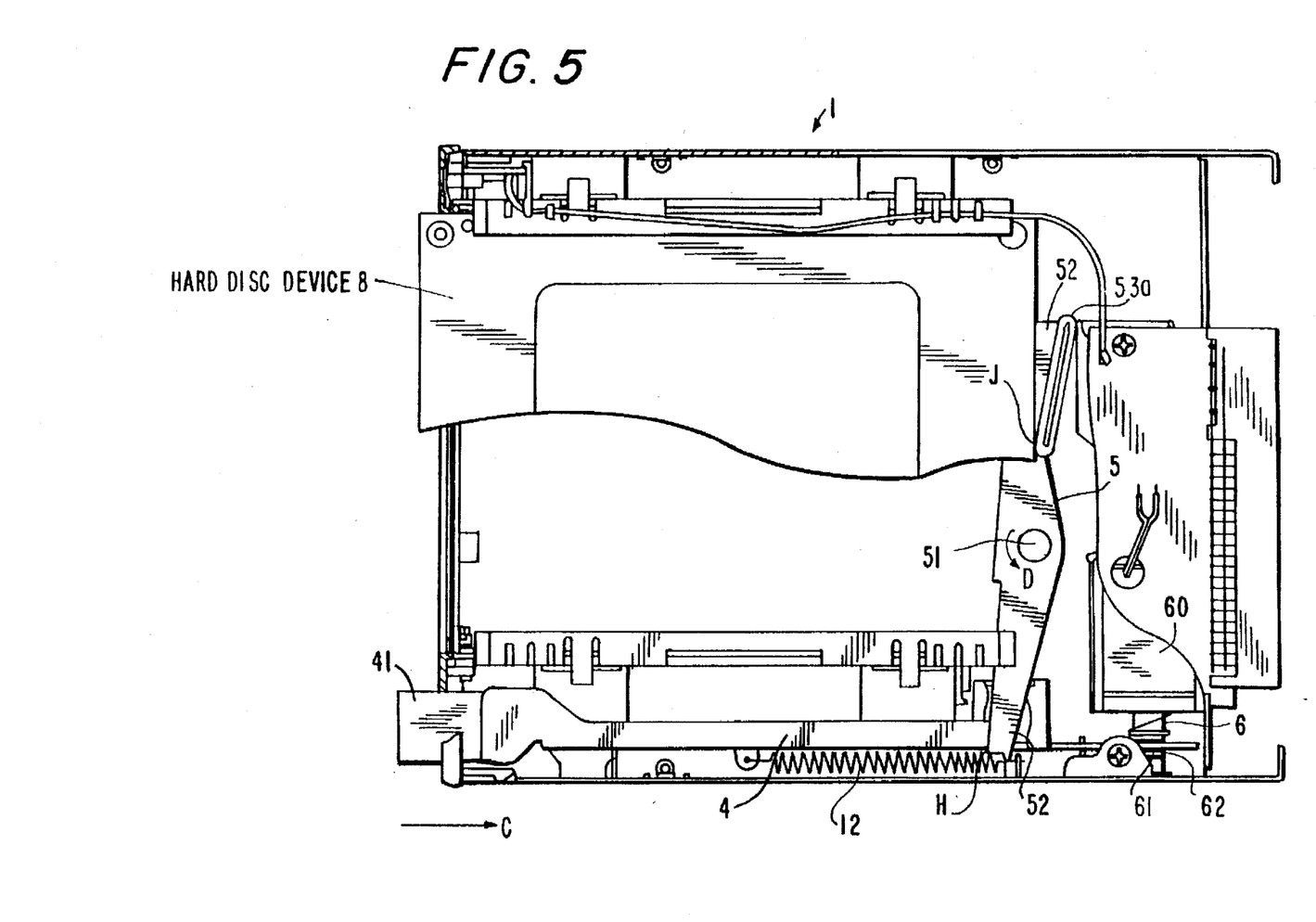
FIG. 5 shows an internal plan view of the loading unit of FIG. 1 with a hard disc device loaded.

The reasons for the above phenomenon will now be described. In a state where the hard disc device 8 is completely loaded in the loading unit 1 as shown in FIG. 5, a first line and a second line form an obtuse angle. The first line is made by connecting the axis 51 and the above-mentioned engaging position on the right end arm 52 of the ejection arm 5. The above-mentioned second line comprises the ejection-button (41) side of the direction C. (The angle formed by the and second lines is such that, the smaller the angle becomes, the further the ejection lever 4 moves in the direction C.) Then, the nearer this angle becomes to a right angle, the further the ejection arm 5 pivots in a direction D. Then, when this angle becomes the right angle, the above-mentioned engagement portion on the right end arm 52 becomes as near the axis 51 as it is possible.

By contrast, the farther from the axis 51 a contacting position, at which the contacting portion 53a of the ejecting arm 5 is in contact with the hard disc device 8, the further the contacting portion 53a together with the ejection arm 5 pivots in the direction D.

Figure 7:
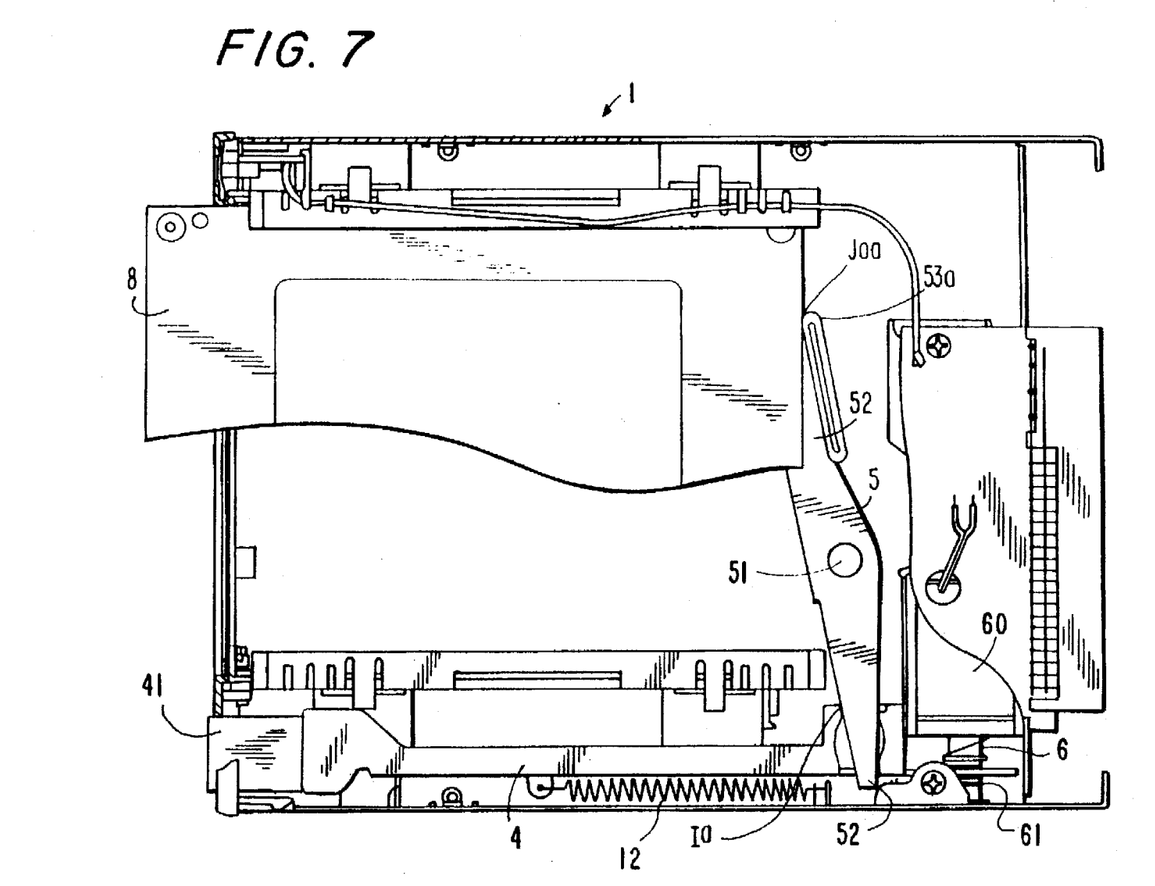
FIG. 7 shows an internal plan view of the loading unit of FIG. 1, at a state further changed from the state of FIG. 6, where the hard disc device has been further moved along a direction in which the hard disc device is ejected.

The reason for the above phenomenon will now be described. The hard disc device 8 has an edge surface advancing when it is inserted into the loading unit 1, the surface being substantially perpendicular to the direction C along which the hard disc device 8 is inserted. An angle formed by the above-mentioned edge surface and the above-mentioned surface, coming in contact with the edge surface of the hard disc device 8, on the contacting portion 53a, varies while the insertion stroke varies. The above-mentioned insertion stroke is a stroke with which the hard disc device 8 is inserted into the loading unit 1. In a state where the hard disc device 8 is completely loaded in the loading unit 1, as shown in FIG. 5, the above-mentioned contacting position on the hard disc device 8 is at a position J of FIG. 5, which position is the nearest to the axis 51. In contrast to this, as shown in FIG. 7, at a state where the hard disc device 8 has been moved in the ejection direction (opposite to the direction C) by a certain distance in comparison to the state of FIG. 5, the above-mentioned contacting position on the hard disc device 8 is at a position $J^{aa}$ of FIG. 7, for which position it is possible to be away from the axis 51.

By the manner as mentioned above in the time of operations, even if the ejection button 41 is pushed by the operator with a uniform force in the direction C, the thus obtained force which the contacting portion 53a applies to the hard disc device 8 varies in a manner as described below. In the ejection time starting from the state shown in FIG. 5 through the state of FIG. 6 and then the state of FIG. 7, the above-mentioned obtained force is first the maximum and then the force is reduced while the hard disc device 8 is further ejected from the loading unit 1.

Electric current flows in a solenoid 60 of the above-mentioned plunger 6 while power is active in the loading unit 1. While electric current flows in the solenoid 60, the plunger 6 retreats in the direction E of FIG. 3. On the other hand, the plunger 6 projects in the direction opposite to the direction E while power is inactive in the loading unit 1 because no electric current is flowing in the solenoid 60 at the time.

While power is active in the loading unit 1 and also the hard disc device 8 is loaded in the loading unit 1, the state of a stopper portion 61 formed on the end of the plunger 6 is as follows. The stopper portion 61, having a diameter larger than the above-mentioned width of the slit 42c, is fitted into the above-mentioned stopper opening 42a. By this fitting of the stopper portion 61 into the opening 42a, the ejection lever 4 is prevented from sliding such that the loaded hard disc device 8 is prevented from being ejected. While power is active in the loading unit 1 but the hard disc device 8 is not loaded in the loading unit 1, the state of the stopper portion 61 formed on the end of the plunger 6 is as follows. The stopper portion 61 is fitted into the above-mentioned stopper opening 42b. By this fitting of the stopper portion 61 into the opening 42b, the ejection lever 4 is prevented from sliding. In this state, the ejection arm 5 is in the state where the arm 51 has pivoted in the direction D by a certain angle and is prevented from pivoting in the direction opposite to the direction D by the engagement of the right end arm 52 of the engagement arm 5 with the front edge 42d1 of the slit 42d. Thus, the hard disc device 8 is prevented from being loaded.

On the other hand, while power is inactive in the loading unit 1 and the hard disc device 8 is not loaded in the loading unit 1, the state of a stopper portion 61 formed on the end of the plunger 6 is as follows. The stopper portion 61 projects in the direction opposite to the direction E as mentioned above. In this state, the stopper portion 61 is located at the right side, when viewed along the direction C, of the stopper opening 42b. A shaft portion 62 is formed at a middle portion of the plunger 6 as shown in FIG. 3, a diameter of which portion 62 is smaller than the above-mentioned widths of the slits 42c and 42d. In the above-mentioned state, the shaft portion 62 is located in the stopper opening 42b. While power is inactive in the loading unit 1 but the hard disc device 8 is loaded in the loading unit 1, the state of a stopper portion 61 formed on the end of the plunger 6 is as follows. The stopper portion 61 projects in the direction opposite to the direction E as mentioned above. In this state, the stopper portion 61 is located on the right side, when viewed along the direction C, of the stopper opening 42b. In the above-mentioned state, the shaft portion 62 is located in the stopper opening 42a. As the diameter of the shaft portion 62 is smaller than the widths of the slits 42c and 42d as mentioned above, the ejecting lever 4 is freely slidable while the shaft portion 62 is in any of the openings 42a and 42b.

Thus, while power is inactive in the loading unit 1, as the ejection lever 4 is slidable as mentioned above, loading into/ejecting from the loading unit 1 of the hard disc device 8 is possible.

As shown in FIG. 1, a connector unit 7 projects in the loading unit 1, which connector unit 7 is used for coupling the hard disc device 8 to a main unit (not shown in the drawings, comprising a host apparatus to the hard disc device 8, and comprising a personal computer for example). The connector unit 7 is provided with connectors 71 and 72. The connector 72 is used to be previously fitted to the above-mentioned main unit. By loading of the hard disc device 8 in the loading unit1, the connector 71 is fitted to a connector (not shown in the drawings) with which the hard disc device 8 is provided. As a result, the hard disc device 8 is electrically coupled to the main unit (personal computer).

In this embodiment of the present invention, the ejection lever acts as a pushing member and the plunger 6 acts as preventing means.

Figure 4:
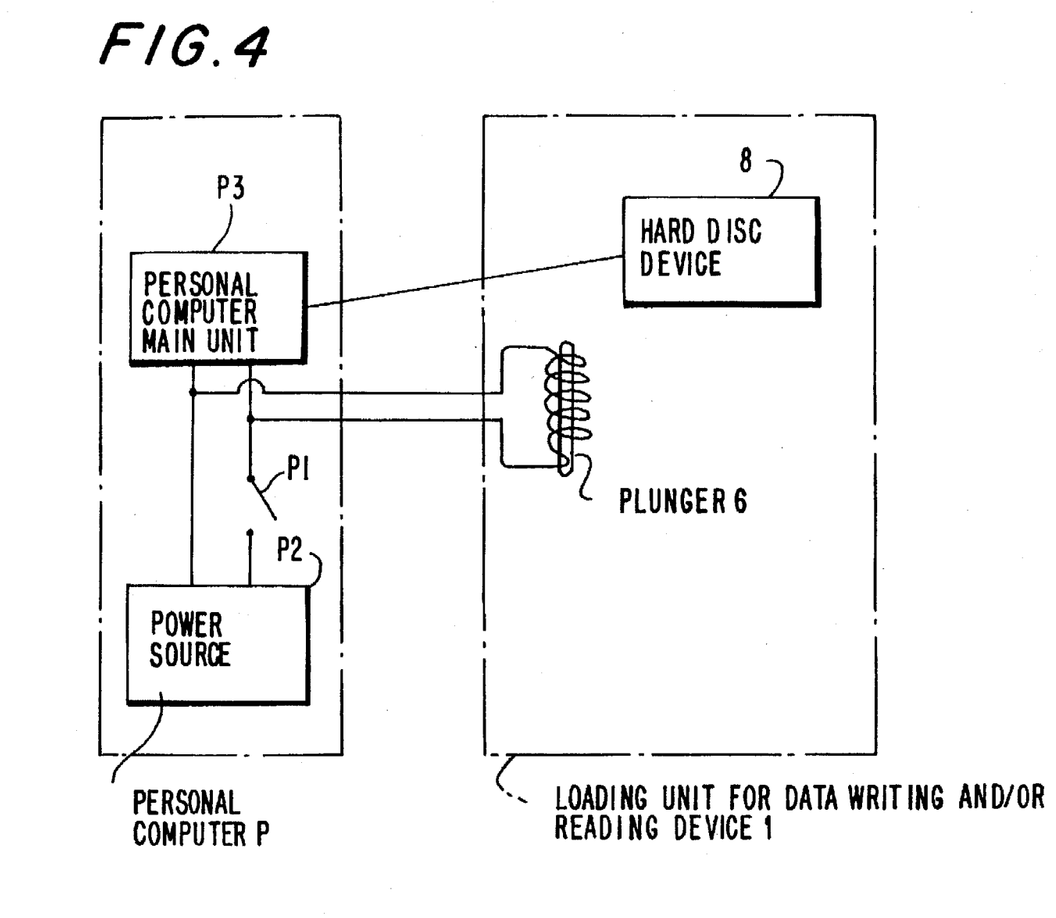
FIG. 4 illustrates a block diagram of general constructions of the loading unit according to the embodiment of the present invention and a personal computer which employs the loading unit.

As shown in FIG. 4, the hard disc device 8 is inserted into and as a result loaded in the loading unit 1, and then a power switch P1 is turned on, which switch P1 is provided with a personal computer P. As a result, a power source P2 is coupled to the loading unit 1 and thus power is active in the loading unit 1. Also, by the above-mentioned loading and turning on of power, hard disc device 8 is coupled to a personal computer main unit P3 and as a result the personal computer main unit P3 can write data into/read data from the hard disc device 8, and also the plunger 6 is coupled to the power source P2 via the switch P1. As a result, while the power switch P1 is in the ON state, the plunger 6 prevents the sliding movement of the ejection lever 4 and consequently prevents the loading/ejecting of the hard disc device 8 in the loading unit 1.

The operation of the above mentioned embodiment of the present invention will now be described.

While power is active in the loading unit 1 and the hard disc device 8 is not loaded in the loading unit 1, electric current is made to flow in the solenoid 60 of the plunger 6. As a result, the plunger 6 retreats as mentioned above and consequently the stopper portion 61, formed on the edge of the plunger 6, engages with the stopper opening 42b formed in the engagement portion 42 of the ejection lever 4, so as to prevent the sliding movement of the ejection lever 4.

While power is active in the loading unit 1 but the hard disc device 8 is loaded in the loading unit 1, electric current is made to flow in the solenoid 60 of the plunger 6. As a result, the plunger 6 retreats as mentioned above and consequently the stopper portion 61, formed on the edge of the plunger 6, engages with the stopper opening 42a formed in the engagement portion 42 of the ejection lever 4, so as to prevent the sliding movement of the ejection lever 4.

Thus, while power is active in the loading unit 1, the sliding movement of the ejection lever 4 and as a result the loading/ejecting of the hard disc device 8 in the loading unit 1 is prevented.

In contrast to this, while power is not active in the loading unit 1 and the hard disc device 8 is loaded in the loading unit 1, electric current is not made to flow in the solenoid 60 of the plunger 6. As a result, the plunger 6 projects as mentioned above and consequently the shaft portion 62, formed on the edge of the plunger 6, is in the stopper opening 42a formed in the engagement portion 42 of the ejection lever 4 as shown in FIG. 5. As a result the ejection lever 4 is slidable in the direction C in FIG. 5.

Subsequently, starting from the state of FIG. 5, an operator pushes the ejecting button 41 by a constant force along the direction C. As a result, as the ejection lever 4 slides accordingly, the slit 42c passes through the shaft portion 62 of the plunger 6 and the ejection arm 5 as a result pivots about the axis 51 in the direction D. As mentioned above, the nearer the axis 51 the engaging position on the right end arm 52 becomes, at which position the front edge 42d1 of the slit 42d engages therewith, the further the ejection lever 4 slides along the direction C. That is, the position $H^a$ of FIG. 6 is nearer the axis 51 than the position H of FIG. 5.

Figure 6:
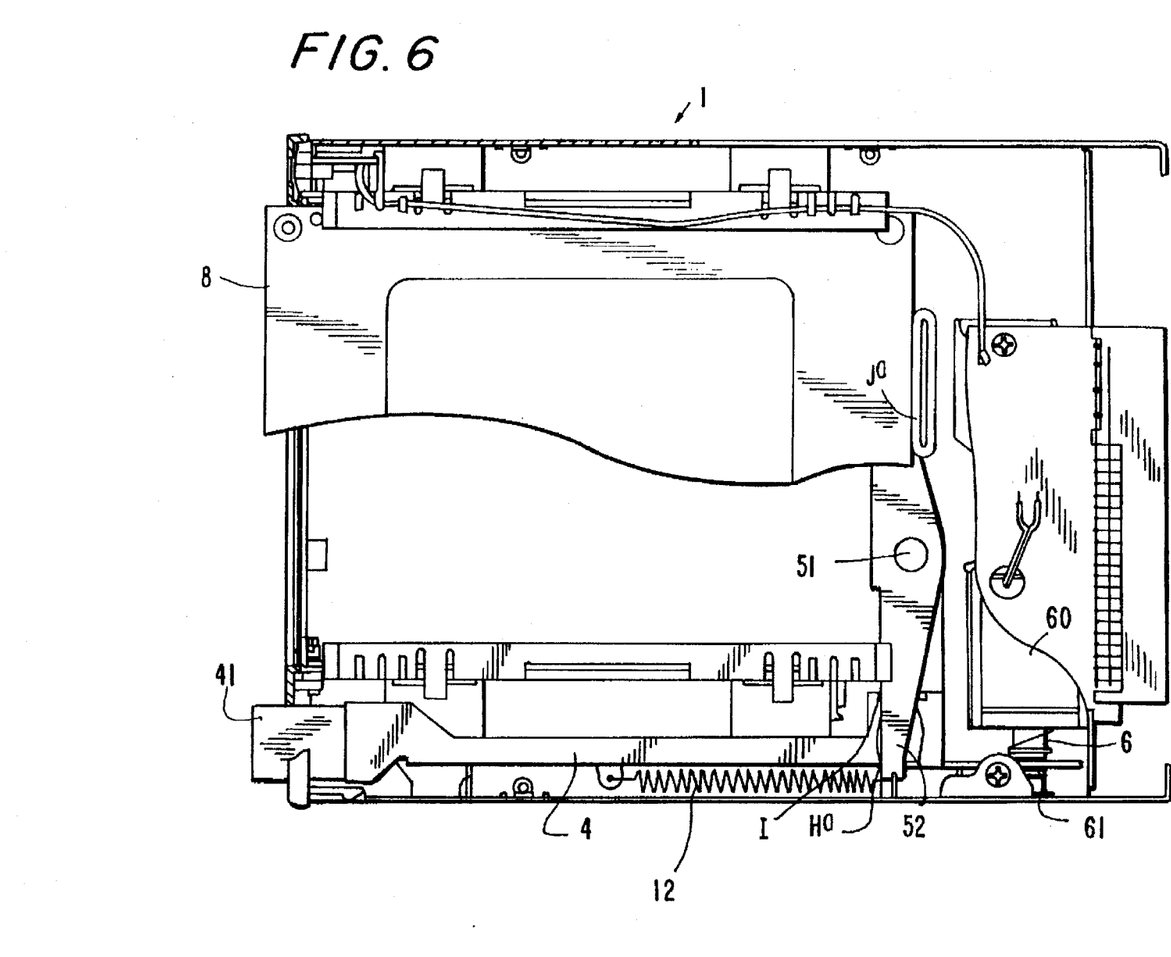
FIG. 6 shows an internal plan view of the loading unit of FIG. 1, in a state changed from the state of FIG. 5, where the hard disc device starts to move so as to be ejected.

Then, after the ejection lever 4 has slid by a certain distance along the direction C, as shown in FIG. 6, the right end arm 52 of the ejection arm 5 engages with the front edge 43a1 of a cut-out portion 43a (shown in FIG. 3) formed in the engagement portion 42 at the position I of FIG. 6 as well as with the front edge 42d1 of the slit 42d at the position $H^a$ of FIG. 6.

Then, after the ejection lever 4 has slid along the direction C by a distance further than the above-mentioned certain distance, as shown in FIG. 7, the right end arm 52 disengages from the front edge 42d1 of the slit 42d and continues to engage with the front edge 43a1 of the cut-out portion 43a at the position $I^a$. The nearer the axis 51 the engaging position on the right end arm 52 becomes, at which position the front edge 43a1 of the cut-out portion 43a engages, the further the ejection lever 4 slides along the direction C. That is, the position $I^a$ of FIG. 7 is nearer the axis 51 than the position I of FIG. 6 is. The reason for this phenomenon is similar to that for the above-mentioned phenomenon in which the engaging position where the front edge 42d1 engages with the right end arm 52 and hence the reason is omitted.

By the above-mentioned manner in the ejection action time, while the operator pushes the ejection button 41 using a constant force, the moment acting on the right end arm 52 of the ejecting arm 5 varies as described below. That is, the moment is maximum first in the ejection action time and then the moment is reduced gradually.

On the other hand, the above-mentioned contacting position at which the contacting portion 53a mounted on the left end 53 of the ejection arm 5 is in contact with the advancing (when the hard disc device 8 is inserted) edge surface of the hard disc device 8 varies as below. This contacting position moves from the position J shown in FIG. 5 to the position $J^{aa}$ shown in FIG. 7 through the position $J^a$ shown in FIG. 6 while the contacting portion 53a together with the ejection arm 5 pivots in the direction D. That is, the contacting position $J^a$ of FIG. 6 is farther from the axis 51 than the contacting position J of FIG. 5 is, and the contacting position $J^{aa}$ of FIG. 7 is even farther therefrom than the contacting position $J^a$ of FIG. 6.

By the above-mentioned manner in the ejecting action time, a pushing force which the contacting portion 53a applies to the above-mentioned advancing edge surface of the hard disc device 8 starts out at a maximum value thereof in the time and then gradually decreases.

Consequently, the loading unit 1 according to the embodiment of the present invention has the following advantages.

Due to the stopper portion 61 of the plunger 6 engaging with the stopper opening 42a or 42b of the ejection lever 4 when power is active in the loading unit 1, the hard disc device 8 is prevented from being loaded into/ejected from the loading unit 1. As a result of the ejection lever 4 being prevented from sliding, damages which may occur, as a result of loading/ejecting of the device 8 at the power-active state, in the hard disc device and/or in the personal computer main unit P3 can be prevented.

Further, by realizing, by a simple construction comprising the ejection lever 4 and plunger 6, the means by which hard-disc-device loading/ejecting may be prevented in the power-active state, the loading unit 1 can be economically manufactured because expensive special control program or electrical circuits are not necessary for this purpose.

Figure 8:
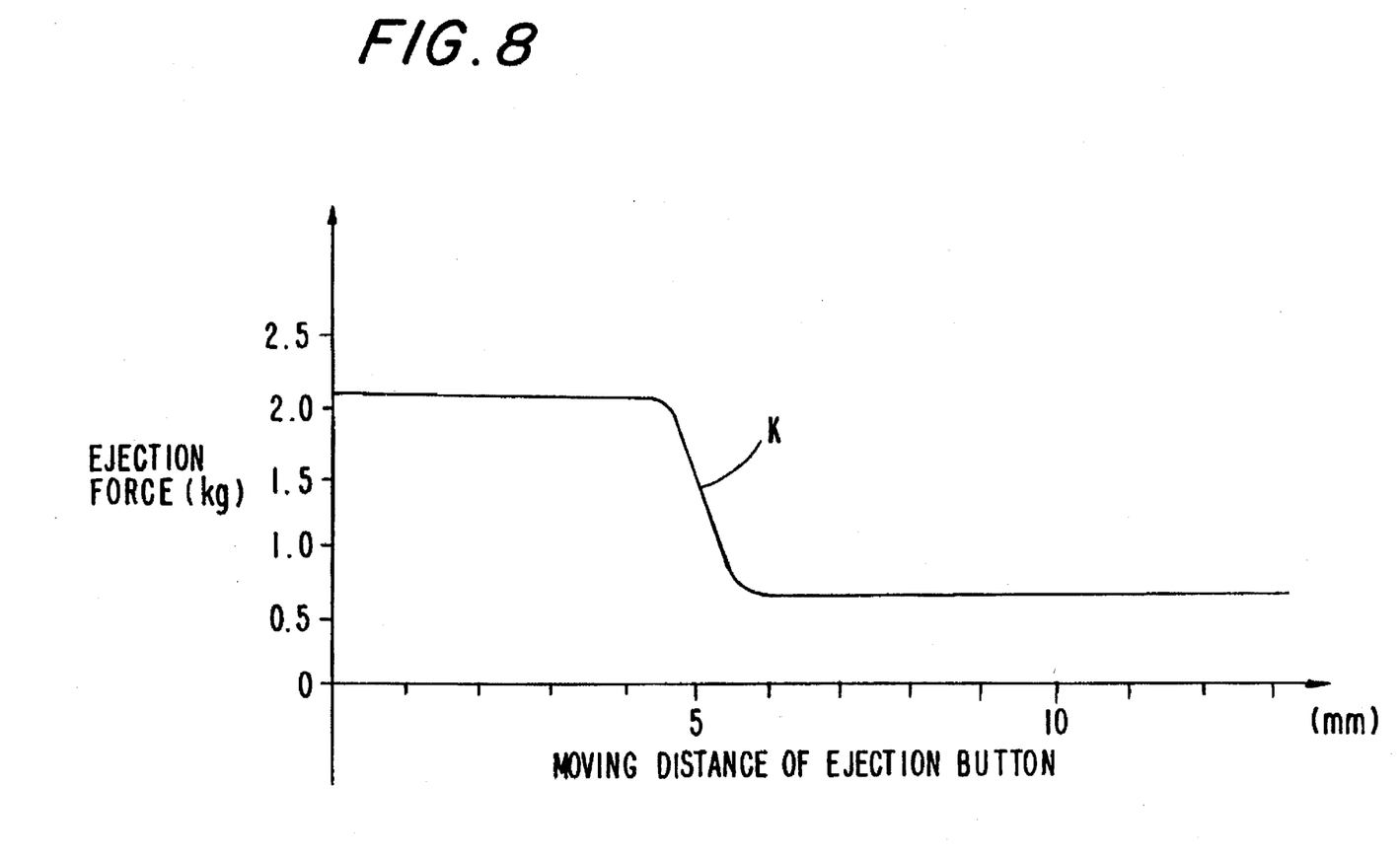
FIG. 8 shows a graph indicating a variation of a force (ejecting force) to be applied to an ejection button in the ejecting action time, which graph illustrates operations according to the present invention.

Further, by constructing the loading unit 1 so that the ejection action is carried out wherein the above-mentioned contacting position (J, $J^a$, $J^{aa}$), at which the ejecting arm 5 is in contact with the hard disc device 8, moves away from the rotational axis 51 of the ejection arm 5, a large initial ejection force can be obtained in the ejection action, as per the solid curve K shown in FIG. 8, even if one kilogram of operation force is applied to the ejection button 41, for example.

Further, by constructing the loading unit 1 so that the ejection action is carried out wherein the above-mentioned engaging position (H, $H^a$, I, $I^a$), at which the ejecting lever 4 engages with the ejection arm 5, moves so as to approach the rotational axis 51 of the ejection arm 5, a large initial ejection force can be obtained in the ejection action, as per the solid curve K shown in FIG. 8, even if one kilogram of operation force is applied to the ejection button 41, for example.

In view of the above it is clear that in a structure of the loading unit according to the present invention, a generally uniform driving force applied to a pressing member results in the thus-applied driving force being converted into a pressing force to move the writing and/or reading device. This pressing force matches the force required to move the writing and/or reading device. Such conversion is achieved through a well-known dynamic principle, the lever principle. That is, in a step in which a relatively large pressing force is required to be applied to the data writing and/or reading device (disc device) so as to move it in the ejecting process, the driving force which an operator applies to the pressing member is then transmitted to the writing and/or reading device via the pressing member while the thus-applied driving force is enlarged to be the pressing force during the transmission. The pressing member thus applies the thus-transmitted enlarged pressing force to the writing and/or reading device to move it. Further, in a step in which a relatively small pressing force is required to be applied to the data writing and/or reading device (disc device) so as to move it in the ejecting process, the driving force is then transmitted to the writing and/or reading device via the pressing member while the thus-applied driving force is reduced to be the pressing force during the transmission. The pressing member thus applies the thus-transmitted reduced pressing force to the writing and/or reading device to move it.

The above-mentioned ejection force as shown in FIG. 8 can be adjusted so as to be adapted to the force required for withdrawing the above-mentioned connector of the hard disc device 8 from the connector 71 (shown in FIGS. 1 and 3). The required force is required at the start of the ejection action for ejecting, from the loading unit 1, the hard disc device 8 loaded therein. The above-mentioned adjustment of the ejection force may be achieved by modifying the construction of the engagement portion 42 and/or the construction of the engagement portion 43, for example.

An embodiment of the present invention is not limited to a loading unit for a hard disc device, such as the loading unit 1 of the above-mentioned embodiment, and other various applications of the present invention are possible for various types of data writing and/or reading devices.

Further, the present invention is not limited to the above described embodiments, and variations and modifications may be made without departing from the scope of the present invention.

What is claimed is:

1. A loading unit for a data writing and/or reading device which contains a recording medium, said loading unit comprising:

ejecting means for ejecting said data writing and/or reading device, which has been loaded on said loading unit, from said loading unit, said ejecting means including an ejecting arm for carrying out a pressing action in which said ejecting arm presses said data writing and/or reading device so as to carry out an ejecting action in which said data writing and/or reading device is ejected from said loading unit;

a slide lever which is supported for reciprocal movement in a direction in which said writing and/or reading device is inserted into said loading unit;

said slide lever having first and second ends and being provided with an ejecting button at the first end thereof;

said ejecting arm being rotatably supported about an axis of rotation in said loading unit and having a first end for movably engaging the second end of said slide lever to form a first point of contact therebetween which moves towards said axis of rotation with the movement of said slide lever and with said slide lever applying a force through said first point of contact so as to move said ejecting arm;

a second end of said arm constituting a pressing portion which presses said writing and/or reading device; and wherein said second end of said ejecting arm has a second point of contact on the pressing portion through which said ejecting arm applies a force to said writing and/or reading device, wherein said second point of contact is shifted along the pressing portion of said second end away from said axis of rotation in concert with the movement of said first point of contact so as to carry out an ejecting action in which said data writing and/or reading device is ejected from said loading unit, said loading unit further comprising connecting/disconnecting means for connecting said data writing and/or reading device to an external apparatus when said data writing and/or reading device is loaded on said loading unit and for disconnecting said data writing and/or reading device from said external apparatus when said data writing and/or reading device is ejected from said loading unit wherein the pressing force applied by said ejecting arm for carrying out the pressing action varies in stages with a stronger pressing force applied to eject the writing and/or reading device upon initiating the removal of the writing and/or reading device from said connecting/disconnecting means followed by a weaker force.

\* \* \* \* \*